(12) United States Patent
Kagata et al.

(10) Patent No.: US 8,883,292 B2
(45) Date of Patent: Nov. 11, 2014

(54) INK COMPOSITION, AND RECORDED MATTER, RECORDING METHOD AND RECORDING APPARATUS USING THE SAME

(75) Inventors: Takayoshi Kagata, Shiojiri (JP); Tsuyoshi Sano, Shiojiri (JP)

(73) Assignee: Seiko Epson Corporation (JP)

( * ) Notice: Subject to any disclaimer, the term of this patent is extended or adjusted under 35 U.S.C. 154(b) by 234 days.

(21) Appl. No.: 12/581,211

(22) Filed: Oct. 19, 2009

(65) Prior Publication Data

US 2010/0098918 A1 Apr. 22, 2010

(30) Foreign Application Priority Data

Oct. 22, 2008 (JP) ................. 2008-272269

(51) Int. Cl.
*B32B 3/10* (2006.01)
*C09D 11/38* (2014.01)

(52) U.S. Cl.
CPC ..................... *C09D 11/38* (2013.01)
USPC ........ 428/195.1; 524/379; 524/376; 427/256; 347/100

(58) Field of Classification Search
USPC .......................................... 523/160, 161, 218
See application file for complete search history.

(56) References Cited

U.S. PATENT DOCUMENTS

| | | | |
|---|---|---|---|
| 4,880,465 A | 11/1989 | Loria et al. | |
| 6,387,984 B1 | 5/2002 | Ito | |
| 2003/0176534 A1 | 9/2003 | Chung et al. | |
| 2005/0117009 A1* | 6/2005 | Kawaguchi et al. | 347/102 |
| 2006/0275606 A1 | 12/2006 | Mizutani | |
| 2007/0213438 A1 | 9/2007 | Mizutani et al. | |
| 2008/0049086 A1* | 2/2008 | Rolly | 347/100 |
| 2008/0097005 A1 | 4/2008 | Shiotani | |
| 2008/0182083 A1 | 7/2008 | Oyanagi et al. | |
| 2008/0233363 A1 | 9/2008 | Goto | |
| 2008/0254265 A1* | 10/2008 | Ito et al. | 428/195.1 |

FOREIGN PATENT DOCUMENTS

| | | |
|---|---|---|
| EP | 0 286 219 A2 | 10/1988 |
| JP | 11-193363 | 7/1999 |
| JP | 2000-103995 | 4/2000 |
| JP | 2000-239585 | 9/2000 |
| JP | 2003-105246 | 4/2003 |
| JP | 2006-56990 | 3/2006 |
| JP | 2006-274214 | 10/2006 |
| JP | 2008-50400 | 3/2008 |

OTHER PUBLICATIONS

English Patent Abstract of Publication No. 2000-103995 Published Apr. 11, 2000.
English Patent Abstract of Publication No. 2000-239585 Published Sep. 5, 2000.
English Patent Abstract of Publication No. 2006-56990 Published Mar. 2, 2006.
Anonymous, "2-Propanol for spectroscopy Uvasol", Merck-chemicals, Merck Safety Data Sheet, Apr. 23, 2009, pp. 1-8,<http://www.merck-chemicals.de/2-propanol/MDA_CHEM-100993/p_uuid?attachments=MSD>.
Anonymous, "(±)-1,2-hexane diol", The Good Scents Company Perfumery & Flavor Raw Materials Information, pp. 1-6, <http://www.thegoodscentscompany.com/data/rw1133711.html>, retrieved on Jan. 14, 2010.
Anonymous, "N-Methyl-2-Pyrrolidone", Sigma-Aldrich Chemie GmbH, Jul. 9, 2004, pp. 1-8, <http://www-wnt.gsi.de/kemchemie/Deutsch/Arbeitssicherheit/SDB_d_pdf/N-METHYL-2-PYR-ROLIDONE_d.pdf>.
Anonymous, "Diethylene Glycol Diethyl Ether", INCHEM Chemical Safety Information, pp. 1-3, http://www.inchem.org/documents/icsc/eics1151.htm, retrieved on Jan. 14, 2010.

* cited by examiner

*Primary Examiner* — Doris Lee
(74) *Attorney, Agent, or Firm* — Harness, Dickey & Pierce, P.L.C.

(57) ABSTRACT

An ink composition contains hollow resin particles and an anti-clearing agent preventing the clearing phenomenon of the hollow resin particles.

20 Claims, No Drawings

INK COMPOSITION, AND RECORDED MATTER, RECORDING METHOD AND RECORDING APPARATUS USING THE SAME

BACKGROUND

1. Technical Field

The present invention relates to an ink composition, and a recorded matter, a recording method and a recording apparatus using the ink composition.

2. Related Art

U.S. Pat. No. 4,880,465 discloses a white ink composition containing hollow resin particles as a white color material. The hollow resin particle is defined by an outer shell made of a liquid-permeable resin, having a hollow interior. The hollow interior of the hollow resin particle of the ink composition filled with a solvent, so that the specific gravity of the resin particle comes to substantially the same as that of the ink composition. Consequently, the hollow resin particles can be stably dispersed in the ink composition. If an image is formed on a recording medium with the ink composition, the solvent filling the interiors of the hollow resin particles is replaced with air by drying, and the hollow resin particle has a difference in refractive index between the outer shell and the hollow interior. This difference causes light scattering to produce a hiding power (hence, to produce white color). The outer shell of the hollow resin particle is generally formed of a transparent resin, such as acrylic resin.

Japanese Unexamined Patent Application Publication Nos. 2000-103995, 2000-239585 and 2006-56990 disclose techniques for enhancing the ejection stability and storage stability of a white ink composition or other color ink compositions. It is however desired that these techniques further be improved in terms of the printing properties.

The white ink composition may be used in combination with other color ink compositions (color ink compositions other than white color ink composition hereinafter referred to as color ink compositions). From the viewpoint of forming a white hiding layer and of the color reproducibility, the combinations of these ink compositions may be taken as follows: (i) an image is recorded by forming a white image region and a color image region on a medium; (ii) a white image layer is formed with a white ink composition, and then a color image layer is formed on the white image layer with a color ink composition; and (iii) a color image layer is formed with an color ink composition, and then a white image layer is formed on the color image layer with a white ink composition.

The present inventors have found that long-term storage and a high-humidity condition degrade the quality of images formed by combining a white ink composition containing hollow resin particles and a color ink composition. In the case of (i), the white image region becomes clear (transparent) around the boundary between the color image region and the white image region. In the cases of (ii) and (iii), the hollow particles present in an image formed by superposing the white image layer and the color image layer one on top of the other became clear to degrade the color tinge of the recorded image.

SUMMARY

Accordingly, an advantage of some aspects of the invention is that it provides an ink composition that contains hollow resin particles as a color material and can form a stable image in combination with other color ink compositions. The quality of the image is not degraded with time and under high-humidity conditions.

The present inventors have found that the clearing phenomenon is caused by the moisturizing agent contained in the color ink composition.

In general, a pigment-based or dye-based ink composition contains a moisturizing agent, such as glycerin or a saccharide, to control the ease of ejection and drying, and the moisturizing agent remains in printed matter to some extent. When a color ink composition and a white ink composition are combined by a technique, such as above (i) to (iii), the moisturizing agent in the color image region or layer of the recorded image, such as glycerin or saccharide, absorbs water from the air, and leaches the water into the white image region or layer or moves into the white image region or layer with water held therein, during a long-term storage or under a high-humidity condition. The moisturizing agent entering white image region or layer penetrates the hollow resin particles in the white image region or layer, with water contained. Probably, such hollow resin particles do not scatter light, and therefore do not produce white color or exhibit hiding power. Thus, the white image region becomes clear. This clearing phenomenon was notably observed in combined use with a color ink composition containing a color material at a low concentration (containing a moisturizing agent in a relatively high proportion), such as a cyan ink composition or a light magenta ink composition.

According to an aspect of the invention, an ink composition is provided which contains hollow resin particles and an anti-clearing agent preventing the clearing phenomenon of the hollow resin particles.

The anti-clearing agent may be a liquid or solid compound having an octanol/water partition coefficient of more than −0.1 and a vapor pressure of less than 10 Pa at 25° C.

The anti-clearing agent may be at least one compound of hexylene glycol and trimethylolpropane.

The total anti-clearing agent content in the ink composition may be 0.1% to 30% by mass.

The hollow resin particles may have a mean particle size of 0.2 to 1.0 μm.

The hollow resin particle content in the ink composition may be 5% to 20% by mass.

The ink composition may further contain at least one compound selected from the group consisting of alkanediols and glycol ethers.

The ink composition may further contain an acetylene glycol-based surfactant or a polysiloxane-based surfactant.

The ink composition may be used in an ink jet recording technique.

According to another aspect of the invention, a recorded matter is provided which includes an image formed with the ink composition.

According to still another aspect of the invention, a recording method is provided which includes forming an image with the ink composition.

According to further aspect of the invention, a recording apparatus is provided which includes a section recording an image by performing the recording method.

The ink composition according to an embodiment of the invention can produce a recorded matter including a high-quality image that can be stably stored for a long term even though the image is formed by combining the ink composition according to an embodiment of the invention and another ink composition containing a moisturizing agent, for example, by combining a white ink composition of an embodiment of the invention and a color ink composition containing a moisturizing agent, because the hollow resin particles in the ink composition of the embodiment do not become clear during a long-term storage and under a high-humidity condition.

DESCRIPTION OF EXEMPLARY EMBODIMENTS

An ink composition according to an embodiment of the invention will now be described in detail.

The invention will be described with reference to an embodiment using hollow resin particles as a white color material for forming white images. However, the hollow resin particles may have another color other than white. For example, the resin forming the hollow resin particles may be colored with another color (in this instance, the resin of the hollow resin particles should maintain the optical transparency thereof). As with the white (uncolored) hollow resin particles, the colored hollow resin particles can also be used for the ink composition according to an embodiment of the invention.

The ink composition may produce a color other than white by combining another color material with the hollow resin particles.

In the embodiment described below, the ink composition is used as a white ink composition for forming a white image region, and other ink compositions containing a moisturizing agent are used as color ink compositions for forming other color image regions. However, the combination of the ink compositions is not limited to the embodiment.

An ink composition according to an embodiment of the invention will now be described. The ink composition of the embodiment is a white ink composition containing hollow resin particles as a white color material.

White Ink Composition

1. Hollow Resin Particles

The hollow resin particles are each defined by an outer shell having a hollow interior. Preferably, the outer shell is made of a liquid-permeable resin. Consequently, if the hollow resin particle is present in an aqueous ink composition, the hollow interior is filled with an aqueous medium. Since the particle filled with an aqueous medium has substantially the same specific gravity as the external aqueous medium, the particle does not sink in the aqueous ink composition and, thus, can maintain the dispersion stability. Thus, the hollow resin particles can enhance the storage stability and the ejection stability of the white ink composition.

After the white ink composition is ejected onto a recording medium, such as paper, the aqueous medium in the particles is dried to form hollow interiors. The particles thus contain air. The hollow resin particles form a resin layer and an air layer having different refractive indices, and thus scatter light effectively to produce white color. The hollow resin particles can be used for other color ink compositions by being colored with the resin layers of the particles maintaining the optical transparency.

In the present embodiment, a known type of hollow resin particles can be used without particular limitation. For example, the hollow resin particle disclosed in U.S. Pat. No. 4,880,465 or Japanese Unexamined Patent Application Publication No. 3,562,754 can be suitably used.

Preferably, the hollow resin particles have a mean particle size (outer diameter) of 0.2 to 1.0 μm, more preferably 0.4 to 0.8 μm. If the mean particles size is more than 1.0 μm, the particles may sink to degrade the dispersion stability, or may clog the ink jet recording head to degrade the reliability. In contrast, hollow resin particles having a mean particle size of less than 0.2 μm tend to be insufficient in whiteness. In addition, it is suitable that the hollow resin particle has an inner diameter of about 0.1 to 0.8 μm.

The mean particle size of the hollow resin particles can be measured with a particle size distribution analyzer based on the laser diffraction/scattering method. A particle size distribution meter using dynamic light scattering (for example, Microtrack UPA manufactured by Nikkiso Co., Ltd.) may be used as the laser diffraction/scattering particle size distribution analyzer.

Preferably, the hollow resin particle content in the white ink composition is 5% to 20% by mass, more preferably 8% to 15% by mass. If the hollow resin particle content (solid content) is more than 20% by mass, the ink composition may, for example, clog the ink jet recording head to degrade the reliability. In contrast, if the hollow resin particle content is less than 5% by mass, a sufficient whiteness may not be obtained.

The hollow resin particles can be prepared by a known method without particular limitation. For example, the hollow resin particles can be prepared by so-called emulsion polymerization. In this method, for example, a vinyl monomer, a surfactant, a polymerization initiator and an aqueous disperse medium are stirred together in a nitrogen atmosphere while being heated, and thus an emulsion of hollow resin particles is prepared.

Exemplary vinyl monomers include nonionic monoethylene unsaturated monomers, such as styrene, vinyl toluene, ethylene, vinyl acetate, vinyl chloride, vinylidene chloride, acrylonitrile, (meth)acrylamide, and (meth)acrylic ester. Exemplary (meth)acrylic esters include methyl acrylate, methyl methacrylate, ethyl(meth)acrylate, butyl(meth)acrylate, 2-hydroxyethyl methacrylate, 2-ethylhexyl(meth)acrylate, benzyl(meth)acrylate, lauryl(meth)acrylate, oleyl(meth)acrylate, palmityl(meth)acrylate, and stearyl(meth)acrylate.

The vinyl monomer may be a bifunctional vinyl monomer. Examples of the bifunctional vinyl monomer include divinylbenzene, allyl methacrylate, ethylene glycol dimethacrylate, 1,3-butane-diol dimethacrylate, diethylene glycol dimethacrylate, and trimethylolpropane trimethacrylate. By polymerizing a foregoing monofunctional vinyl monomer and a bifunctional vinyl monomer to form many cross-links, the resulting hollow resin particles can exhibit heat resistance and solvent resistance as well as light scattering characteristics.

The surfactant forms a molecular aggregate such as micelle in water. Examples of such a surfactant include anionic surfactants, nonionic surfactants, cationic surfactants, and amphoteric surfactants.

The polymerization initiator can be a known compound soluble in water, such as hydrogen peroxide or potassium persulfate.

The aqueous disperse medium can be water that may or may not contain a hydrophilic organic solvent.

2. Anti-Clearing Agent

The ink composition of the present embodiment contains an anti-clearing agent that prevents the clearing phenomenon of the hollow resin particles.

Preferably, the anti-clearing agent is a liquid or solid compound having an octanol/water partition coefficient of more than −0.1 and a vapor pressure of less than 10 Pa at 25° C. More preferably, the octanol/water partition coefficient is −0.5 or more and the vapor pressure at 25° C. is 3 Pa or less. Although the mechanism of how the clearing phenomenon of the hollow resin particles is prevented is unknown, the following two are thought of. The anti-clearing agent having the above octanol/water partition coefficient exhibits a lower affinity for water than that for the moisturizing agent in the color image region, and can be present together with the moisturizing agent in a recorded image formed with a white image region and a color image region. Since the anti-clearing agent has a higher affinity for the moisturizing agent than the affinity for water in the air, the water cannot penetrate the white image region. If the anti-clearing agent has a vapor pressure of less than 10 Pa at 25° C., the anti-clearing agent can remain as a moisturizing agent in the white image region to prevent water from penetrating from the color image region. If the anti-clearing agent is a solid compound, the movement of the anti-clearing agent is minimized in an image. Accordingly, even if the moisturizing agent containing water moves into the white image region from the color image region, the solid anti-clearing agent traps the moisturizing agent containing water before the moisturizing agent penetrates the hollow interiors of the hollow resin particles, and does not move in the image. Thus, the clearing phenomenon of the white image region can be prevented.

Preferably, at least one of hexylene glycol and trimethylolpropane is used as the anti-clearing agent, and more preferably trimethylolpropane is used. Hexylene glycol and trimethylolpropane as well as glycerin are known as moisturizing agents used in ink compositions. When hexylene glycol or trimethylolpropane are used in a white ink composition containing hollow resin particles as a color material, it serves as an anti-clearing agent for the hollow resin particles. Since the clearing phenomenon of the hollow resin particles is thus prevented even during a long-term storage or under a high-humidity condition, a recorded matter produced by recording an image using the white ink composition can maintain the high-quality image thereof for a long term.

Preferably, the total anti-clearing agent content in the white ink composition is 0.1% to 30% by mass, more preferably 0.5% to 20% by mass.

3. Fixing Resin

Preferably, the white ink composition of the present embodiment further contains a resin for fixing the hollow resin particles. Examples of such a resin include acrylic resins (for example, Almatex produced by Mitsui Chemicals) and urethane resins (for example, WBR-022U produced by Taisei Fine Chemical).

The fixing resin content in the ink composition is preferably 0.5% to 10% by mass, more preferably 0.5% to 3.0% by mass.

4. Penetrating Organic Solvent

Preferably, the white ink composition further contains at least one compound selected from the group consisting of alkanediols and glycol ethers. Alkanediols and glycol ethers can increase the wettability of the record surface of the recording medium to enhance the penetration of the ink.

Preferred alkanediols are 1,2-alkanediols having a carbon number in the range of 4 to 8, such as 1,2-butanediol, 1,2-pentanediol, 1,2-hexanediol, 1,2-heptanediol, and 1,2-octanediol. More preferably, 1,2-alkanediols having a carbon number of 6 to 8 are used, such as 1,2-hexanediol, 1,2-heptanediol, and 1,2-octanediol. These alkanediols can easily penetrate the recording medium.

Exemplary glycol ethers include lower alkyl ethers of polyhydric alcohols, such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, dipropylene glycol monomethyl ether, dipropylene glycol ethyl ether, triethylene glycol monomethyl ether, triethylene glycol monobutyl ether, and tripropylene glycol monomethyl ether. Triethylene glycol monobutyl ether can particularly provide a higher record quality.

Preferably, the alkanediol and/or glycol ether content in the white ink composition is 1% to 20% by mass, more preferably 1% to 10% by mass.

5. Surfactant

Preferably, the white ink composition of the present embodiment further contains an acetylene glycol-based surfactant or a polysiloxane-based surfactant. Acetylene glycol-based and polysiloxane-based surfactants can increase the wettability of the record surface of the recording medium to enhance the penetration of the resulting ink.

Examples of the acetylene glycol-based surfactant include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. A commercially available acetylene glycol-based surfactant may be used, such as OLFINEs E1010, STG and Y (produced by Nissin Chemical Industry); and SURFYNOLs 104, 82, 465, 485, 485 and TG (produced by Air Products and Chemicals Inc.).

The polysiloxane-based surfactant may be a commercially available product, such as BYK-347 or BYK-348 (produced by BYK).

The white ink composition may contain other surfactants, such as anionic surfactant, nonionic surfactant, and amphoteric surfactant.

Preferably, the surfactant content in the white ink composition is 0.01% to 5% by mass, more preferably 0.1% to 0.5% by mass.

6. Tertiary Amine

Preferably, the white ink composition further contains a tertiary amine. The tertiary amine can serve as a pH adjuster and can easily control the pH of the white ink composition.

For example, triethanolamine may be used as the tertiary amine.

Preferably, the tertiary amine content in the white ink composition is 0.01% to 10% by mass, more preferably 0.1% to 2% by mass.

7. Solvent and Other Additives

The white ink composition generally contains water as the solvent. Preferably, the water is pure water or ultrapure water, such as ion exchanged water, ultrafiltered water, reverse osmotic water, or distilled water. Particularly preferably, the water is sterilized by irradiating with UV light or adding hydrogen peroxide. Such water prevents occurrence of molds and bacteria over a long term.

The white ink composition may further contain other additives including a fixing agent such as water-soluble rosin, an antifungal agent or preservative such as sodium benzoate, an antioxidant or ultraviolet light adsorbent such as an allophanate, a chelating agent, and an oxygen absorbent, if necessary. These additives may be used singly or in combination.

The ink composition according to an embodiment of the invention may further contain another color material other than the hollow resin particles. A general pigment of dye may be used as such a color material.

8. Preparation of Ink Composition

The white ink composition can be prepared in the same manner as known pigment inks, using a known apparatus, such as ball mill, sand mill, attritor, basket mill or roll mill. For preparation, it is preferable that coarse particles be removed through a membrane filter or a mesh filter.

The white ink composition can form a white image by being applied onto a recording medium. Examples of the recording medium include paper, cardboard, textile, sheet or film, plastics, glass, and ceramics.

The white ink composition can be used for any application without particular limitation, and can be used for a variety of ink jet recording methods. Ink jet recording methods include thermal ink jet method, piezoelectric ink jet method, continuous ink jet method, roller application, and spray application.

Recorded Matter

A recorded matter according to an embodiment of the invention includes an image recorded using the ink composition described above. The image of the recorded matter is recorded by combining the ink composition according to an embodiment of the invention and another ink composition containing a moisturizing agent. For example, the white ink composition according to the above embodiment and a general color ink composition containing a moisturizing agent may be combined to produce a recorded matter. The hollow resin particles in the recorded matter do not become clear during a long-term storage and under a high-humidity condition, and the recorded matter can maintain the quality of the image over a long term.

Recording Method and Recording Apparatus

The ink composition according to an embodiment can be used in a recording method for recording an image on a recording medium.

Examples of the recording method include, but not limited to, relief printing, intaglio printing, planographic printing, mimeographic recording, electrophotographic recording, thermal ink transfer recording and ink jet recording. Preferably, ink jet recording is used.

Any known technique can be used for ink jet recording. In particular, superior image recording can be performed by a technique for ejecting droplets by vibration of a piezoelectric element (recording technique using an ink jet head that forms ink droplets by mechanical deformation of an electrostrictive element) and a technique using thermal energy.

A recording apparatus according to an embodiment of the invention performs a recoding method according to an embodiment of the invention to record an image.

EXAMPLES

The invention will be described in detail with reference to Examples. However, it is not limited to the Examples.

1. Preparation of White Ink Composition

According to the compositions shown in Table 1, hollow resin particles, a fixing resin, an organic solvent, an anti-clearing agent, a tertiary amine, a surfactant and ion exchanged water were mixed by stirring, and the mixture was filtered through a metal filter of 5 μm in pore size. The filtrate was deaerated with a vacuum pump. Thus, ink compositions of Examples 1 and 2 and Comparative Examples 1 to 3 were prepared. The values in Table 1 are shown on a percent-by-mass basis, and the values of the hollow resin particles are on a solid content basis.

TABLE 1

| | Example | | Comparative Example | | |
|---|---|---|---|---|---|
| Component | 1 | 2 | 1 | 2 | 3 |
| White hollow resin particles SX8782(D) Solid content: 20.5% | 10 | 10 | 10 | 10 | 10 |
| Trimethylolpropane | 10 | — | — | — | — |
| Hexylene glycol | — | 10 | — | — | — |
| Glycerin | — | — | 10 | — | — |
| Tetraethylene glycol | — | — | — | 10 | — |
| Polyethylene glycol Mean particle size: 400 | — | — | — | — | 10 |
| Urethane resin | 5 | 5 | 5 | 5 | 5 |
| 1,2-hexanediol | 3 | 3 | 3 | 3 | 3 |
| Triethanolamine | 0.5 | 0.5 | 0.5 | 0.5 | 0.5 |

TABLE 1-continued

| | Example | | Comparative Example | | |
|---|---|---|---|---|---|
| Component | 1 | 2 | 1 | 2 | 3 |
| BYK-348 | 0.5 | 0.5 | 0.5 | 0.5 | 0.5 |
| Ion exchange water | Balance | Balance | Balance | Balance | Balance |
| Total | 100 | 100 | 100 | 100 | 100 |
| Change of color tinge after white and color printing | AA | A | C | B | C |
| Clearing phenomenon in white image region around boundary | AA | A | C | C | C |

Commercially available product SX8782 (D) (produced by JSR) shown in Table 1 was used as the hollow resin particles. SX8782 (D) is of aqueous dispersion type and has a solid content of 20.5%. Its particles have an outer diameter of 1.0 m and an inner diameter of 0.8 μm.

BYK-348 (produced by BYK) is a polysiloxane-based surfactant.

WBR-022U (produced by Taisei Fine Chemical) was used as the urethane resin.

For the white ink compositions of Examples 1 and 2, hexylene glycol or trimethylolpropane was used as the anti-clearing agent. On the other hand, the white ink compositions of Comparative Examples 1 to 3 used general moisturizing agents: glycerin, tetra ethylene glycol and polyethylene glycol (average molecular weight: 400). These moisturizing agents are generally used in ink compositions. Table 2 shows the octanol/water partition coefficient and the vapor pressure at 25° C. of the anti-clearing agents. The octanol/water partition coefficient was measured according to OECD Guideline for the testing of chemicals 107, Partition coefficient (n-octanol/water): Shake flask method, and JIS Z 7260-107 (2000), Partition coefficient (1-octanol/water) Shake flask method.

TABLE 2

| | Octanol/water partition coefficient | Vapor pressure (25° C.) |
|---|---|---|
| Hexylene glycol | +0.88 | 1.7 Pa |
| Trimethylolpropane | −0.5 | — |
| Glycerin | −1.76 | 0.01 Pa |
| Tetraethylene glycol | −1.36 | 1 Pa |
| Polyethylene glycol Mean particle size: 400 | −1.0 | 10 Pa |

2. Evaluation 2-1. Change of Color Tinge after White and Color Printing

For printing a white image, the black ink chamber of the cartridge of an ink jet printer (PX-G930 manufactured by Seiko Epson) was filled with any one of the white ink compositions shown in Table 1. The ink cartridge was loaded in the printer, and printing tests were performed.

For printing a color image, a commercially available ink jet printer (PX-G5500 manufactured by Seiko Epson) and an ink set (EPSON IC9CL3337 including photo black, matte black, gray, light gray, yellow, cyan, light cyan, magenta, and light magenta) were used.

Then, printing was performed on ink jet recording paper (OHP sheet, manufactured by Seiko Epson) at a resolution of 720×720 dpi. The white and color images were each formed as a 100% duty-solid pattern.

More specifically, a color image layer was formed on a medium with color ink compositions other than the white ink composition, and subsequently, a white image layer was formed on the color image layer with the white ink composition.

The change of color tinge of the resulting printed matter was evaluated under a high humidity condition, according to the criteria below. The results are shown in Table 1.

The L* value was measured with a colorimeter using a black substrate, such as Gretag Macbeth Spectroscan and Spectrolino (manufactured by X-Rite).

The duty mentioned herein is calculated from the following equation:

$$\text{Duty (\%)} = \text{number of actually printed dots}/(\text{vertical resolution} \times \text{lateral resolution}) \times 100$$

(In the equation, the number of actually printed dots refers to the number of dots actually printed per unit area, and the vertical resolution and the lateral resolution each refer to a resolution per unit length. A duty of 100% means that a maximum amount of a single color ink is used for an image.)

AA: when an image was allowed to stand under the conditions of a temperature of 27° C. and a humidity of 35% for 24 hours, and subsequently under the conditions of a temperature of 27° C. and a humidity of 65% for 24 hours, the reduction in L* value of the color inks in the white+color image region was less than 2;

A: when an image was allowed to stand under the conditions of a temperature of 27° C. and a humidity of 35% for 24 hours, and subsequently under the conditions of a temperature of 27° C. and a humidity of 65% for 24 hours, the reduction in L* value of the color inks in the white+color image region was 2 or more and less than 5;

B: when an image was allowed to stand under the conditions of a temperature of 27° C. and a humidity of 35% for 24 hours, and subsequently under the conditions of a temperature of 27° C. and a humidity of 65% for 24 hours, the reduction in L* value of the color inks in the white+color image region was 5 or more and less than 10; and C: when an image was allowed to stand under the conditions of a temperature of 27° C. and a humidity of 35% for 24 hours, and subsequently under the conditions of a temperature of 27° C. and a humidity of 65% for 24 hours, the reduction in L* value of the color inks in the white+color image region was 10 or more.

2-2. Clearing Phenomenon of White Image Region Around Boundary after White and Color Printing For printing a white image region, the black ink chamber of the cartridge of an ink jet printer (PX-G930 manufactured by Seiko Epson) was filled with any one of the white ink compositions shown in Table 1. The ink cartridge was loaded in the printer, and printing tests were performed. For printing a color image, a commercially available ink jet printer (PX-G5500 manufactured by Seiko Epson) and an ink set (EPSON IC9CL3337 including photo black, matte black, gray, light gray, yellow, cyan, light cyan, magenta, and light magenta) were used.

Then, printing was performed on ink jet recording paper (OHP sheet, manufactured by Seiko Epson) at a resolution of 720×720 dpi. The white and color images were each formed as a 100% duty-solid pattern.

More specifically, a white image region and a color image region were recorded on a medium so as to come into contact with each other, and the clearing phenomenon with time of the white image region around the boundary between the white image region and the color image region was evaluated at room temperature, according to the criteria below. The results are shown in Table 1.

The white image region and the color image region each had an area of 100 mm by 100 mm. For measuring the clearing phenomenon, the L* value was measured with a colorimeter using a black substrate, such as Gretag Macbeth Spetroscan and Spectrolino (manufactured by X-Rite). It was determined that when the L* value of a portion was reduced by 30 or more from the initial value, a clearing phenomenon occurred at the portion.

AA: A clearing phenomenon occurred in a region less than 0.2 mm from the boundary after the image was allowed to stand for a month;

A: A clearing phenomenon occurred in a region from 0.2 mm to less than 0.5 mm from the boundary after the image was allowed to stand for a month;

B: Clearing occurred in a region from 0.5 mm to less than 5 mm from the boundary after the image was allowed to stand for a month; and C: A clearing phenomenon occurred in a region 5 mm or more from the boundary after the image was allowed to stand for a month.

The recorded matters including images formed by combining a white ink composition of Example 1 or 2 and other color ink compositions hardly exhibited a change of color tinge or a clearing phenomenon in the white image region around the boundary between the color image region and the white image region, even during a long-term storage or even under a high-humidity condition.

On the other hand, recorded matter including images formed using white ink compositions of the Comparative Examples notably exhibited clearing phenomena in the white image regions. Probably, the cause of the clearing phenomenon is that the moisturizing agent in the color ink composition holds water from the air and, thus, moves the water into the white image region, and that the moisturizing agent (glycerin, tetraethylene glycol or polyethylene glycol (average molecular weight: 400)) in the white ink composition has an influence on the white image region.

What is claimed is:

1. An ink composition comprising hollow resin particles, an anti-clearing agent selected from the group consisting of hexylene glycol and trimethylolpropane, and at least one compound selected from the group consisting of alkanediols and glycol ethers, wherein the hollow resin particles have optical transparency.

2. The ink composition according to claim 1, wherein the total content of the anti-clearing agent in the ink composition is 0.1% to 30% by mass.

3. The ink composition according to claim 1, wherein the hollow resin particles have a mean particle size of 0.2 to 1.0 μm.

4. The ink composition according to claim 1, wherein the hollow resin particle content in the ink composition is 5% to 20% by mass.

5. The ink composition according to claim 1, further comprising an acetylene glycol-based surfactant or a polysiloxane-based surfactant.

6. The ink composition according to claim 1, wherein the at least one compound is an alkanediol.

7. The ink composition according to claim 1, wherein the at least one compound is a glycol ether.

8. A method for ink jet recording comprising providing the ink composition according to claim 1, and ejecting droplets of the ink composition through an ink jet head and onto a recording medium to form an image thereon.

9. A recorded matter comprising an image formed with the ink composition as set forth in claim 1.

10. A recording method comprising forming an image with the composition as set forth in claim 1.

11. A recording apparatus comprising a section recording an image by performing the recording method as set forth in claim 10.

12. An ink composition for depositing on a recording medium wherein it can dry and form an image thereon, the ink composition comprising resin particles having optical transparency in an aqueous medium, the resin particles consisting of an outer shell made of a liquid-permeable resin and an interior, the interior being filled with the aqueous medium before deposition on the recording medium, the interior being hollow after deposition and drying of the ink composition on the recording medium such that, after the deposition and drying, the resin particles consist of an outer resin layer and an inner air layer, wherein the ink composition further comprises an anti-clearing agent that is a liquid or solid compound having an octanol/water partition coefficient of −0.5 or more and a vapor pressure at 25° C. of 3 Pa or less, said anti-clearing agent being present in the ink composition in an amount effective to inhibit the resin particles from becoming clear.

13. The ink composition according to claim 12, wherein the total content of the anti-clearing agent in the ink composition is 0.1% to 30% by mass.

14. The ink composition according to claim 12, wherein the hollow resin particles have a mean particle size of 0.2 to 1.0 μm.

15. The ink composition according to claim 12, wherein the hollow resin particle content in the ink composition is 5% to 20% by mass.

16. The ink composition according to claim 12, further comprising at least one compound selected from the group consisting of alkanediols and glycol ethers.

17. The ink composition according to claim 12, further comprising an acetylene glycol-based surfactant or a polysiloxane-based surfactant.

18. The ink composition according to claim 12, wherein the anti-clearing agent is a compound selected from the group consisting of hexylene glycol and trimethylolpropane.

19. The ink composition according to claim 18, wherein the ink composition consists essentially of the resin particles, the anti-clearing agent and the aqueous medium.

20. A method for ink jet recording comprising providing the ink composition according to claim 12, and ejecting droplets of the ink composition through an ink jet head and onto a recording medium to form an image thereon.

* * * * *